United States Patent
Ronen

[19]

[11] Patent Number: 5,864,610
[45] Date of Patent: Jan. 26, 1999

[54] INTERACTIVE AND INFORMATION DATA SERVICES TELEPHONE BILLING SYSTEM

[75] Inventor: Yzhak Ronen, Mercer County, N.J.

[73] Assignee: AT&T Corp., Middletown, N.J.

[21] Appl. No.: 13,455

[22] Filed: Jan. 26, 1998

Related U.S. Application Data

[63] Continuation of Ser. No. 532,336, Sep. 22, 1995, Pat. No. 5,745,556.

[51] Int. Cl.⁶ .................................................. H04M 15/00
[52] U.S. Cl. ......................... 379/127; 379/112; 379/114; 379/115; 379/119; 348/3
[58] Field of Search .................................... 379/111, 112, 379/114, 115, 119, 121, 127, 134; 705/30, 34–35, 39–40; 348/1, 3, 6–8

[56] References Cited

U.S. PATENT DOCUMENTS

| | | | |
|---|---|---|---|
| 5,003,584 | 3/1991 | Benyacar et al. | 379/119 |
| 5,148,474 | 9/1992 | Haralambopoulos et al. | 379/114 |
| 5,187,710 | 2/1993 | Chau et al. | 379/114 |
| 5,504,933 | 4/1996 | Saito | 348/3 |
| 5,635,980 | 6/1997 | Lin et al. | 348/13 |
| 5,729,594 | 3/1998 | Klingman | 379/93.12 |
| 5,745,556 | 4/1998 | Ronen | 379/127 |

FOREIGN PATENT DOCUMENTS

| | | |
|---|---|---|
| WO97/01920 | 1/1997 | WIPO. |
| WO97/03410 | 1/1997 | WIPO. |

OTHER PUBLICATIONS

Yang, INETphone: Telephone Sevices and Servers on Internet, Network working Group, 6 pages, Apr. 1995.

*Primary Examiner*—Curtis A. Kuntz
*Assistant Examiner*—Duc Nguyen
*Attorney, Agent, or Firm*—Stephen M. Gurey

[57] ABSTRACT

Billing for information and/or interactive services provided to a user over the Internet by an information service provider (ISP) is arranged by the user by placing a virtual billing telephone call to a 900 telephone number associated with the ISP for such billing purposes. The cost to the user for the 900 number billing telephone call, which is determined by the ISP, represents the charge for receiving the information and/or interactive services from the ISP, and is billed to the user's telephone number account. The ISP's 900 number account is credited by the telephone company for the call and thus for the information and/or interactive services provided.

16 Claims, 9 Drawing Sheets

5,864,610

INTERACTIVE AND INFORMATION DATA SERVICES TELEPHONE BILLING SYSTEM

CROSS-REFERENCE TO RELATED APPLICATIONS

This is a continuation of Ser. No. 08/532,336, filed Sep. 22, 1995 now U.S. Pat. No. 5,745,556.

TECHNICAL FIELD

This invention relates to a method of billing for information and interactive services.

BACKGROUND OF THE INVENTION

Currently, thousands of information and interactive services are available to users over data networks such as the Internet. Large information service providers such as Prodigy, America Online and Compuserve provide their own information and interactive services and can provide a gateway access to the Internet and the thousands of small service providers around the world. Users may also access the Internet and the thousands of smaller information service providers (ISPs) directly through smaller user-local Internet access providers. Generally, the large information service providers bill their customers on a time-usage basis after a financial payment relationship has been established. Similarly, the smaller user-local Internet access providers usually also base their service charges to their subscribers for access to the Internet on a time-usage basis. The smaller ISPs currently either do not charge for access to their information and interactive services, or, if they do, also require the user to establish some sort of financial relationship. A frequent user to a particular established ISP may not be adverse to establishing a financial relationship for payment purposes. However, if a user accesses many different ISPs, each on only a casual basis, he is not likely to want or be able to establish a plethora of relationships with so many different providers. ISPs that do or would like to charge for access to their information and/or interactive services could do so by requiring the user to input their credit card number before data service is provided. A user may not, however, want to provide his credit card number to an ISP which is basically unknown to him and with whom he will probably have only the most fleeting interaction. Furthermore, it is well publicized that personal credit card information should not be transmitted over a public data network, which may be subject to unauthorized access.

An object of the present invention is to provide a payment mechanism for a user to access an ISP on the Internet which charges for information and/or services provided and which does not require either the establishment of a financial relationship between the user and the ISP, or the user to supply a credit card number over the Internet.

SUMMARY OF THE INVENTION

In accordance with the present invention, for billing purposes for receiving information and/or interactive services provided by an ISP on a data network such as the Internet, a telephone company supplies the ISP with a telephone number in which charges are set by the called party. Such numbers are commonly known as "900 numbers." Users access the ISP as they usually do on a first connection over the Internet or any other data network, using a technology such as Web client/server technology. Billing is effected, however, on a second connection through either an actual or a virtual telephone call placed to the ISP's 900 telephone number and charged to the user. After receiving an authenticated actual or virtual call, and by associating such call with the user's request over the Internet for information and/or interactive services, the ISP provides the user with the requested information and/or service. Payment by the user for the provided information and/or service is thus effected by billing the user's telephone account for the actual or virtual 900 number call placed to the ISP. The ISP receives payment from the telephone company through the crediting of its 900 number account for the call. With this arrangement, the billing mechanism is removed from the mechanism of providing information and/or interactive services and the user can be confident that billing will be effected through the trusted telephone company. Furthermore, the user can access a plurality of different ISPs which have associated 900 numbers for billing purposes, without needing to establish a financial relationship with any one or providing a credit card number via the Internet. From the ISP's standpoint, a method of receiving payment is provided for the information and/or interactive services supplied to a multitude of different users through the use of an established mechanism through the telephone company, a trustworthy third party that they know will pay them.

In one embodiment of the invention the user dials the ISP's 900 number on a telephone set whose number is supplied to the ISP by the user over the Internet. By comparing the Automatic Number Identification (ANI) of the received 900 number call with the telephone number supplied by the user on the Internet, the ISP identifies and authorizes service to the user at the user's associated Internet network address. The term "network address" as used herein means the mechanism for identifying the user of the service and could be the Internet protocol address or any other mechanism for identifying the user on the Internet or on any other network. For those situations in which the ANI may not be available, the ISP supplies the user with an identification number over the Internet which is entered by the user on the 900 number call to the ISP by means of a touch-tone multifrequency input. The ISP then identifies the 900 number call with the particular user and authorizes the provision of data service to that user on the Internet.

In another embodiment the user, rather than directly placing a 900 number call to the ISP, clicks on an icon on his terminal screen to receive a confirmation screen directly supplied over the Internet by the telephone company. By entering the 900 number of the ISP and the identification number supplied by the ISP, the telephone company places the 900 call to the ISP and passes the identification number to the ISP for association with the user. In a similar embodiment, the network address of the user is passed by the telephone company to the ISP for association of the 900 call with the request for data service. In another embodiment, a virtual call rather than an actual call is placed to the ISP's 900 number. In this embodiment the user clicks to the telephone company's confirmation screen and the telephone company automatically charges the user's phone number for placing the 900 number call to the ISP and credits the ISP's 900 number account. The telephone company then forwards the network address of the confirmed user to the ISP over the Internet, rather than over the telephone network, to indicate to the ISP that data service to the user at the network address has been approved.

In the last three embodiments, in order to prevent fraud, means are incorporated to authenticate the user as being properly associated with the telephone number that he provides to the telephone company for billing purposes. Specifically, in these embodiments, before they are sent to the telephone company, the user's telephone number and a password known only to the user and to the telephone company, are encrypted with a public encryption key that is associated with only the telephone company. Only the telephone company, with its own private encryption key, is able to decode the telephone number and password. After authenticating the user by confirming the association between the decrypted telephone number and the password provided by the user, the ISP begins to provide the requested information and/or interactive services to the user.

DETAIL DESCRIPTION

Figure 1:
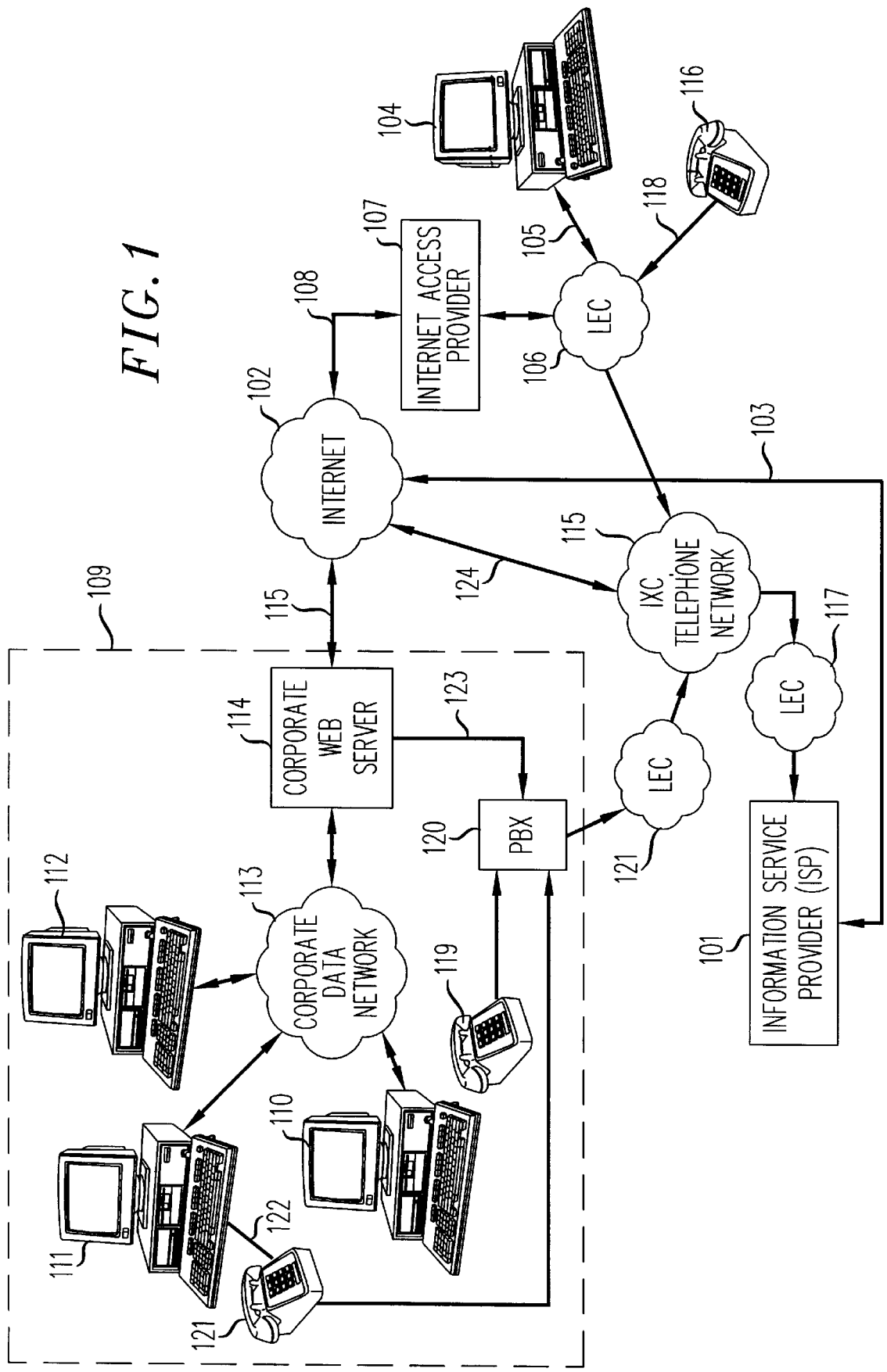
FIG. 1 is a block diagram of a system in accordance with the present invention, which provides billing services through a telephone network for information and/or interactive services provided over a data network, such as the Internet.

With reference to FIG. 1, a system is shown which provides access for users on a data network to information and/or interactive services, and a billing mechanism on a telephone network for the provision of those services. For purposes of illustration, it will be assumed that the data network is the Internet, although it is to be understood that the present invention is not limited to billing for information and/or interactive services provided on only the Internet. In FIG. 1, a single ISP 101 is shown connected on the Internet network 102. It should be appreciated, however, that thousands of ISPs are connected to the Internet and are available for access to the multitude of users around the world having access to the Internet. Connection between the ISP 101 and the Internet 102 is over T1 digital transmission facilities 103, or other high speed transmission lines. A user desiring access to the information and/or interactive services available over the Internet from ISP 101 may be an individual who accesses the Internet through his terminal 104. Terminal 104 can be connected to the Internet 102 over a POTS telephone connection 105 to the user's local exchange carrier (LEC) network 106 through a modem (not shown). From the LEC 106, connection is made to a user-local Internet access provider 107, which provides access to the Internet over T1 digital transmission facilities 108.

Other users may be located within a common corporate (or educational) environment, such as 109 in the figure, using, for example, terminals 110, 111 and 112, which are connected to a corporate (or educational) data network 113. Corporate (or educational) data network 113 can be a local area network (LAN) or wide area network (WAN), which is connected to a corporate web server 114. Server 114 provides its own information and/or interactive services to users using the terminals within the corporate (or educational) environment 109, while simultaneously being available to other users on the Internet. The corporate web server 114 is connected to the Internet 102 over T1 digital transmission facilities 115 or other digital facilities. The corporate (or educational) users can thus access the information and/or interactive services available on corporate web server 114, or they can access over Internet 102 the information and/or interactive services available through ISP 101, or any other ISP connected to the Internet 102, although not shown in the figure.

As previously discussed, charging for the information and/or interactive services that can be provided to a user from an ISP, such as ISP 101, can present a problem if the user has not established a financial billing relationship with the ISP. Establishing such a relationship, or alternatively arranging payment by credit card over the Internet is likely to impose an impediment to a user who desires to access ISP 101 on only a casual basis. Generally, many ISPs today do not charge for access to their information and/or interactive services, even though a substantial benefit is provided to their users because of the lack of an acceptable billing mechanism. Thus, the establishment of a simple and trustworthy billing mechanism can be of substantial financial value to an ISP who may receive hundreds, if not thousands, of requests for information and/or interactive services each day. Furthermore, charging the user a fair fee for access to information and/or interactive services that users consider of value will not likely hinder the user from accessing the ISP.

In accordance with the present invention, billing for the information and/or services provided to a user by an ISP on the Internet (or other data network) is effected by a real or virtual separate phone call placed by the user on the telephone network to a 900 telephone number subscribed to by the ISP for these billing purposes. As used herein, "900 number", "900 telephone number", or "900 number service" refer to any type of telephone service in which the called party sets the rate for calls placed thereto by any calling party and then receives the revenues therefrom. Generally such rates can be based on a fixed cost per call, such as is used for television polling in which the calling party is billed a fixed amount for each call. Alternatively, the rate can be based on a cost per interval of time, in which the calling party is billed in accordance with the duration of the call, such as is used to access various audio information services. When a user places a call to a 900 number, his telephone account is billed for the telephone call and the account of the 900 number subscriber is credited for the call, less a service charge.

In accordance with the billing arrangement of the invention described herein, once the ISP receives the 900 number call from a user and associates that telephone call with a waiting request for service on the Internet, the requested information and/or service to the user's terminal can be provided. If the billing mechanism is arranged so that the 900 number call connection needs to remain intact during the user's access to the ISP, billing for the 900 will be based on the duration of the connection. Alternatively, to conserve use of the telephone network, the 900 number call can be terminated once the association with the Internet request is made, and the user can be given a predetermined session time with the ISP or a predetermined number of "pages" of information for the cost of the 900 number call. The user can then be given the option to extend his session time or the number of "pages" of information provided by placing an additional real or virtual 900 number call to the ISP.

Figure 2:
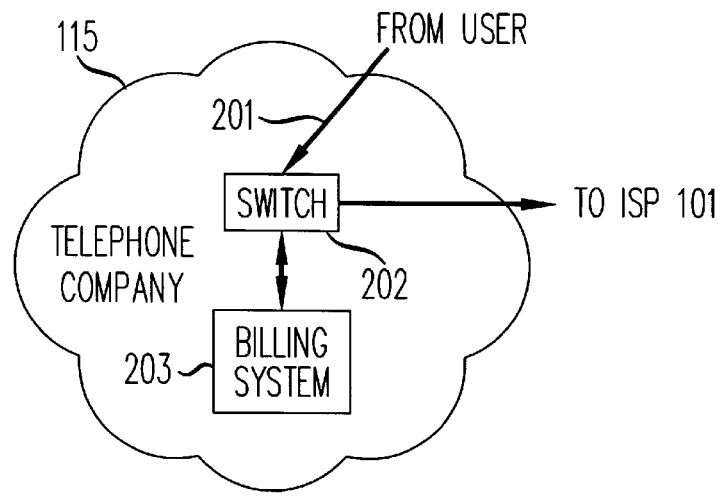
FIG. 2 illustrates a first configuration of a telephone company billing system in which a phone call is placed by the user to the ISP's 900 billing number.

Various arrangements can be implemented for establishing either a real or a virtual billing call from the user to the ISP's 900 number through an interexchange carrier (IXC) telephone network 115 providing the 900 number service to ISP 101. The user at terminal 104 can place a telephone call through his telephone set 116 to the ISP's 900 number. This call is connected through the user's LEC network 106 and onto the IXC telephone network 115 providing the 900 number service. In FIG. 2, which illustrates the pertinent components of network 115 relevant to the invention herein required for such a call, the call from the user on 201 is connected to a switch 202, which connects the call to the ISP 101 through the ISP's LEC 117 (in FIG. 1). A billing system 203 is associated in network 115 with switch 202 to effect billing to each user's telephone bill for calls connected to the ISP's 900 billing number, and for crediting the ISP's account of such calls from all users. The call placed by the user on telephone set 116 can be made over a telephone line 118 separate from line 105 over which the user's Internet connection is being made. Alternatively, a modem (not shown) capable of simultaneously handling both an independent voice connection and a data connection can be used to connect the terminal 104 and telephone set 116 to the LEC 106.

In the corporate (or educational) environment 109, the user at terminal 110 may place the billing call using his associated telephone set 119. This call is passed through the corporate PBX 120, to the LEC network 121 associated with PBX 120, and onto the IXC network 115 to ISP 101. Alternatively, the user at terminal 111 can dial the ISP's 900 number on his associated telephone set 121 in response to a signal on line 122 from his terminal. Alternatively, the user at terminal 112 can direct the PBX 120 to dial the designated ISP's 900 billing number by means of a signal over line 123 from corporate web server 114.

Figure 3:
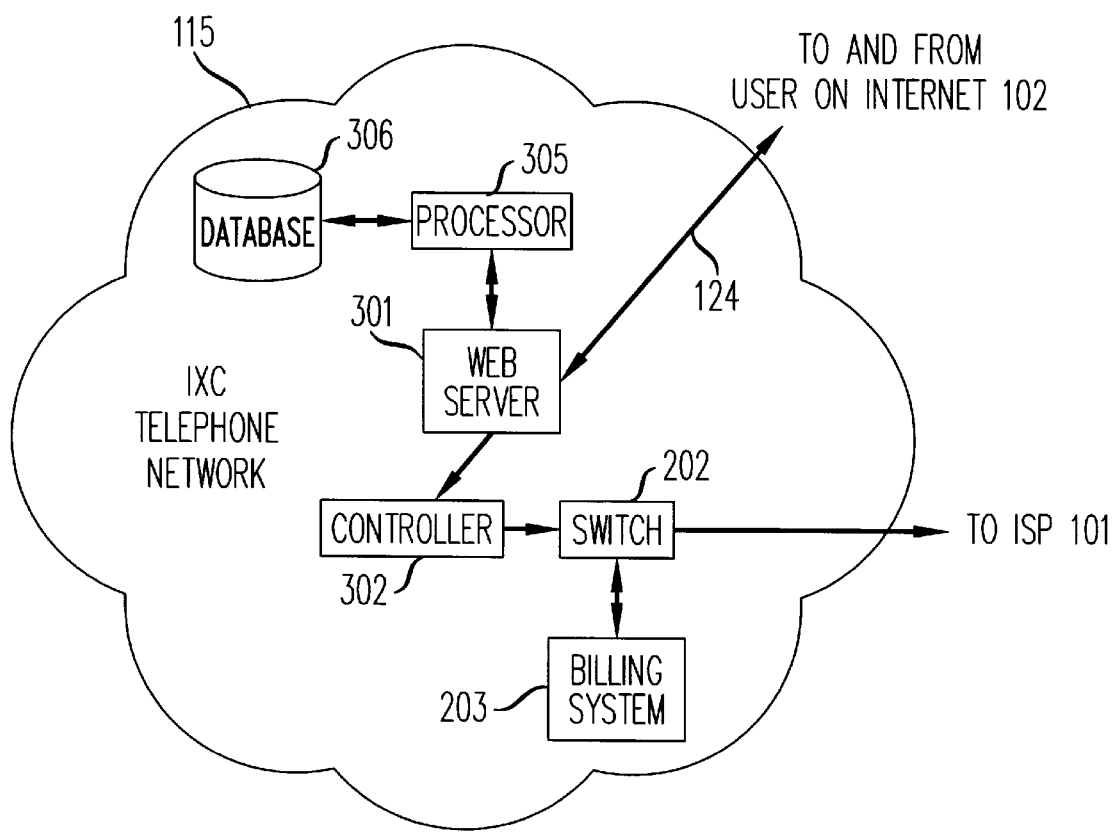
FIG. 3 illustrates a second configuration of a telephone company billing system in which a phone call is placed to the ISP's 900 billing number in response to a signal on the Internet from the user to a server associated with the telephone company.

Rather than directly placing a call to the 900 billing number of ISP 101, a user can instruct the telephone network 115, via the Internet 102, to place the billing call to ISP 101. FIG. 3 is a block diagram showing the functional configuration of network 115 that permits this arrangement. In order to access the telephone network 115 over the Internet 102, a user clicks on a telephone company icon to retrieve a page from a web server 301 within telephone network 115, which is connected to the Internet over digital transmission facilities 124. In response to a user's input over the Internet indicating the 900 number to which the billing call is to be made, web server 301 directs a controller 302 to place a call through the switch 202 (numbered the same as in FIG. 2) to ISP 101. In the same manner described in connection with FIG. 2, the billing system 203 (numbered the same as in FIG. 2) associated with switch 202 bills the identified user for the 900 call and credits the ISP's 900 number account.

Figure 4:
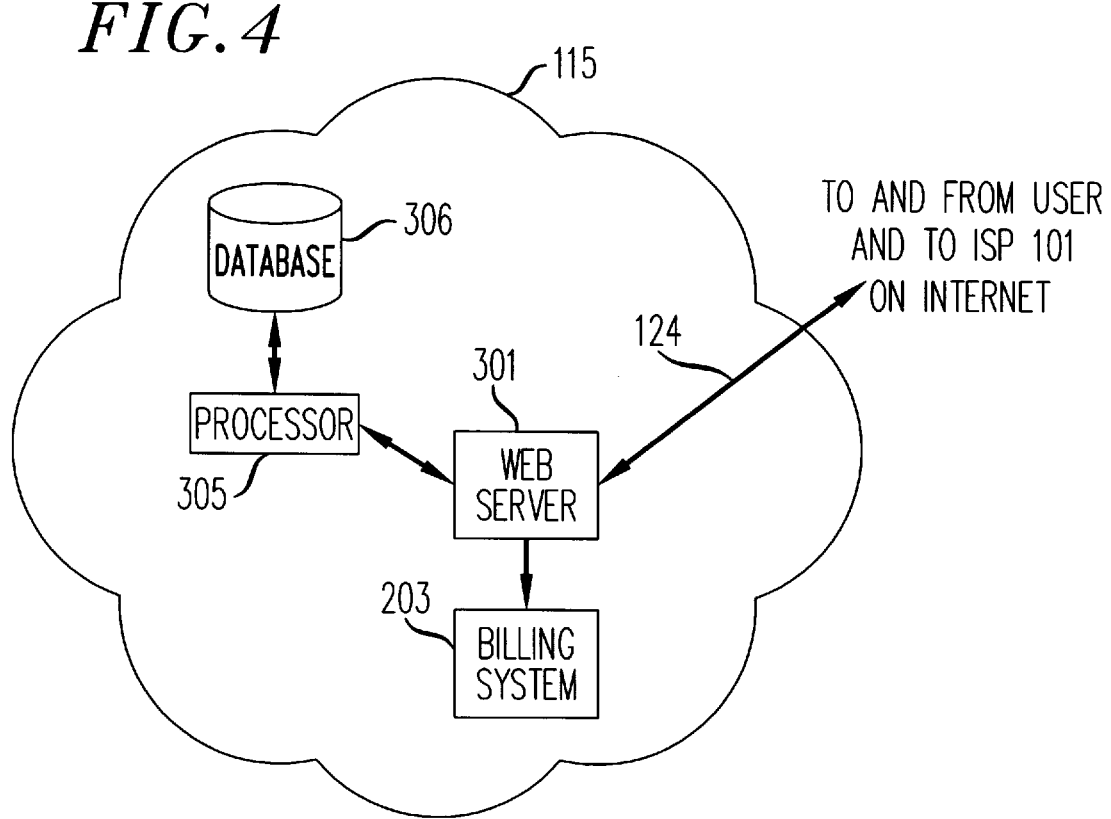
FIG. 4 illustrates a third configuration of a telephone company billing system in which a virtual rather than an actual phone call is placed to the ISP's 900 billing number, wherein billing the user's telephone bill for a call to the ISP's 900 number billing number and crediting the ISP's 900 number telephone account for this virtual call is effected by the telephone company in response to a signal on the Internet from the user to a server on the Internet that is associated with the telephone company.

Rather than dialing an actual 900 number call to ISP 101 over the telephone network, a virtual call can be placed which effects billing to a user and crediting to the ISP for a call to the ISP. FIG. 4 is a block diagram showing the functional configuration of network 115 that permits this arrangement. As previously described, the user clicks on a telephone company icon to access the telephone network 115 over the Internet 102 and retrieve a page from web server 301 (numbered the same as in FIG. 3). Rather than directing a switch to place an actual telephone call to ISP 101 over the telephone network, server 301 interacts directly with the billing system 203 to charge the identified user's telephone account for a 900 number call to ISP 101, and to credit ISP 101 for that same call. The web server 301 then informs ISP 101 that a billing call has been received from an identified user by means of a message over the Internet 102 via digital transmission facilities 124, through the Internet 102 and over digital transmission facilities 103.

In the aforedescribed arrangements in which the telephone company interacts with the user over the Internet for purposes of placing either a real or virtual call to ISP 101, the user must provide his telephone number in order to effect billing. To prevent a user from fraudulently entering an incorrect telephone number, the user is required to transmit to the telephone company's web server 301 both a telephone number and a password known only to the user and the telephone company, which are encrypted by the user's terminal using a public key associated with only the telephone company. The encrypted telephone number and password can be decrypted only by applying a private key known only to the telephone company to the encrypted information. Thus, the user's telephone number and password are protected from unauthorized access on the Internet. The use of public and private keys for encrypting and decrypting information and for authenticating users is well known in the art and is described, for example, by W. Diffie in "The first ten years of public-key cryptography", *Proceedings of the IEEE*, 76:560–577, 1988. The decrypted user-provided telephone number and password are processed by a processor 305 within telephone network 115 in FIGS. 3 and 4. The user is authenticated by comparing the decrypted telephone number and password provided with the known password associated with that telephone number that is stored in a database 306. If the correct password is provided, the user is authenticated. Once the user is authenticated, the telephone company signals the ISP via either the 900 number call directed thereto as in FIG. 3, or via the Internet as in FIG. 4. In this latter situation, the message to the ISP from the telephone company informing the ISP that the user is authenticated can also be encrypted in order to prevent fraud. Thus, the message from the telephone company is encrypted with the telephone company's private key and is decrypted by the ISP using the telephone company's public key.

Figure 5:
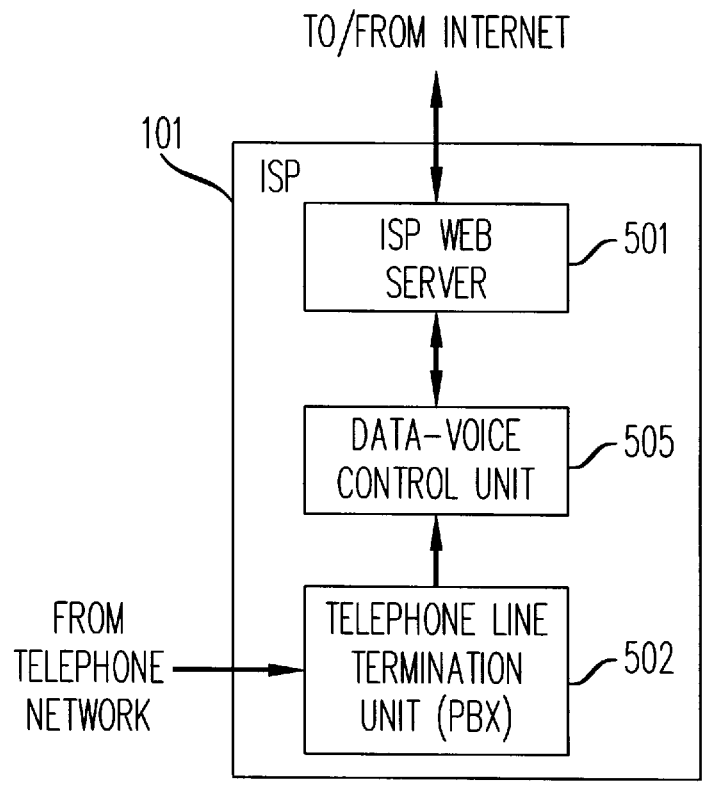
FIG. 5 is a block diagram of the ISP showing the inter-relationship between the Internet and the telephone network required for associating a request for service and a 900 number billing call.

In each of the embodiments described above, ISP 101 must be capable of identifying a request for information and/or interactive services placed over the Internet with a subsequent real or virtual 900 number call placed to it. FIG. 5 is a block diagram representation of ISP 101 showing the relationship between the elements that interact with the Internet and those that interact with the telephone network. ISP includes a web server 501 for providing information and/or interactive services on the Internet and a telephone line termination unit 502, such as a PBX, to terminate the plurality of 900 number calls being placed to the ISP for billing of the plurality of different requests that are likely to be simultaneously made over the Internet. A data-voice control unit 503 serves as the interface between the web server 501 and unit 502 for comparing information provided over the telephone network in a format such as dual-tone multifrequency tones, with data received from the Internet. Control unit 503 functions to inform web server 501 of the identify of a user for whom billing has been confirmed.

Figure 6:
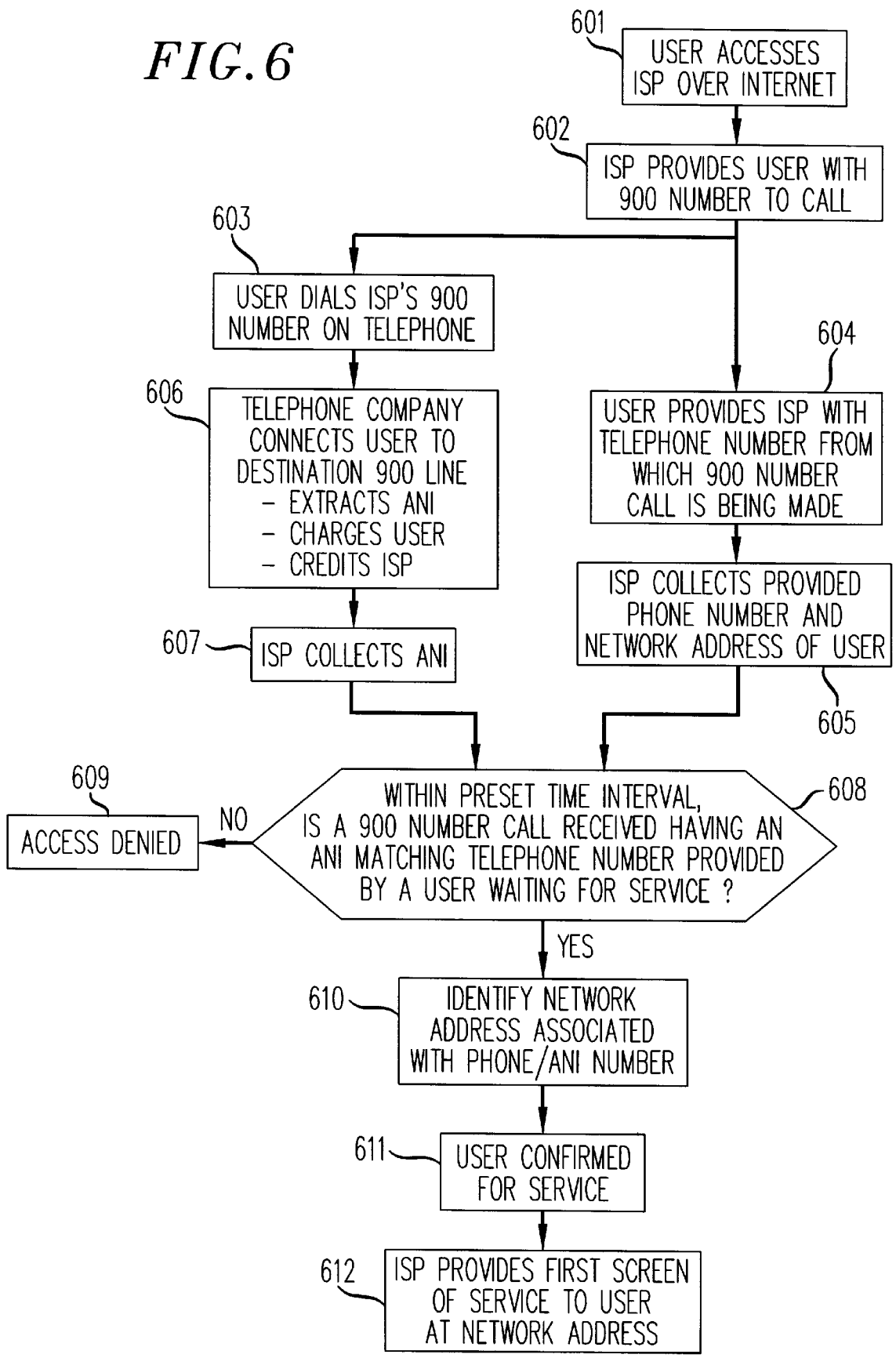
FIG. 6 is a flowchart showing the steps for connecting a user to an ISP on the Internet while billing for such connection is effected through the telephone network for a first embodiment of the invention in which the user places a call to the ISP's 900 billing number from an ANI identifiable telephone station.

FIG. 6 is a flowchart detailing the billing mechanism and associated Internet connection setup for a scenario in which a user places a 900 number call to the ISP from an identifiable telephone station set. At step 601 the user access the ISP over the Internet. The ISP then, at step 602, provides the user with a 900 number to call for billing authorization. The user then dials the ISP's 900 number (step 603) and provides the ISP, over the Internet, the telephone number from which the 900 number call is being made (step 604). The ISP collects the telephone number provided over the Internet and the network address of the user on the Internet (step 605). The network address of a user on the Internet is available and known to ISPs and server to which the user is connected. Simultaneously, the telephone company connects the user to the dialed ISP 900 billing number, charges the user for the 900 call and credits the ISP's 900 number account, and extracts and passes to the ISP the ANI of the user's telephone station (step 606). The ISP collects the user's ANI (step 607). If the telephone number provided over the Internet by the user does not match the ANI provided to the ISP over any received 900 number billing call within a preselected time interval after a request for service is made (step 608), then the user is denied access (step 609). If a 900 number call to the ISP has a matching ANI, then the data-voice control unit 505 within ISP 101 identifies the network address associated with the phone number/ANI of the user (step 610) and the user is confirmed for service (step 611). The ISP then provides the first screen of service to the user at the user's network address (step 612).

Figure 7:
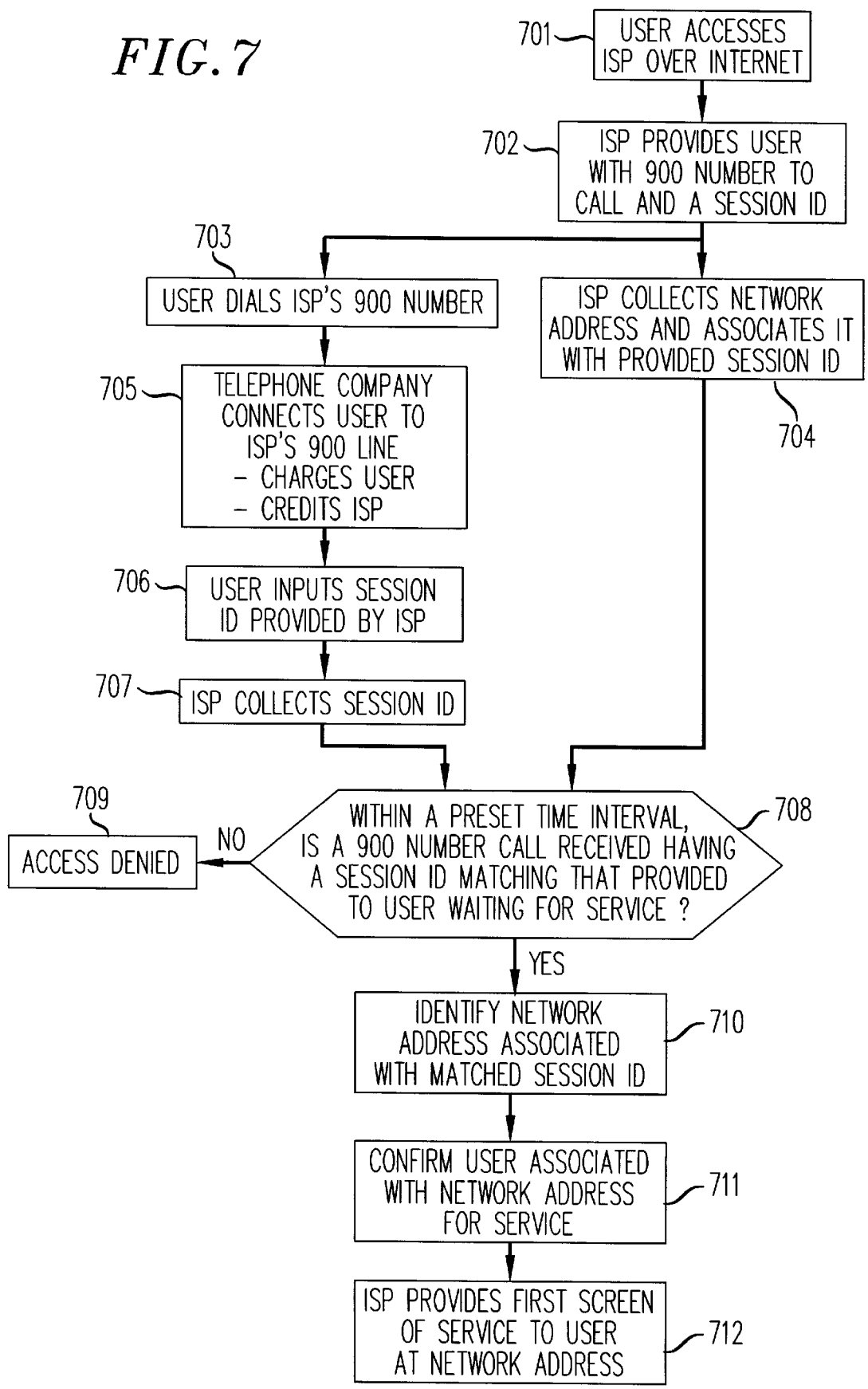
FIG. 7 is a flowchart for a second embodiment of the invention in which the user places a call to the ISP's 900 billing number from a telephone station that cannot be identified by its ANI, but which uses a session identification number supplied to the user by the ISP on the Internet connection and returned to the ISP on the billing call to properly associate the billing call with the Internet connection.

FIG. 7 is a flowchart detailing the billing mechanism and associated Internet connection setup for a scenario in which a user places a 900 number call to the ISP from a telephone station set which cannot be identified by its ANI, as may be the case when the user is located behind a PBX or where the user has directed a corporate server to place the 900 number billing call to the ISP. As in the previous scenario, the user accesses the ISP over the Internet (step 701), which provides a 900 billing number to call and a session identity (ID) number (step 702). The user dials the ISP's 900 billing number (step 703) while the ISP collects the network address of the user and associates it with the session ID number (step 704). The telephone company connects the user to the ISP's 900 line and charges the user for the 900 number call and credits the ISP (step 705). In order to identify the 900 number billing call with the request for service on the Internet, the user inputs via his touch-tone dial, in response to a prompt, the session ID provided by the ISP over the Internet (step 706). The control unit 503 of ISP then collects the inputted session ID via the 900 number telephone call (step 707). If, within a predetermined time interval, a 900 number call is not received that has a session ID number that matches the session ID number of a user awaiting service, access to the ISP for that user is denied (step 709). Otherwise, if a match is found, control unit 503 identifies the network address associated with the matched session ID (step 710) and the user at that address is confirmed for service (step 711). The ISP web server 501 then provides the first screen of service to the user at that network address (step 712).

Figure 8:
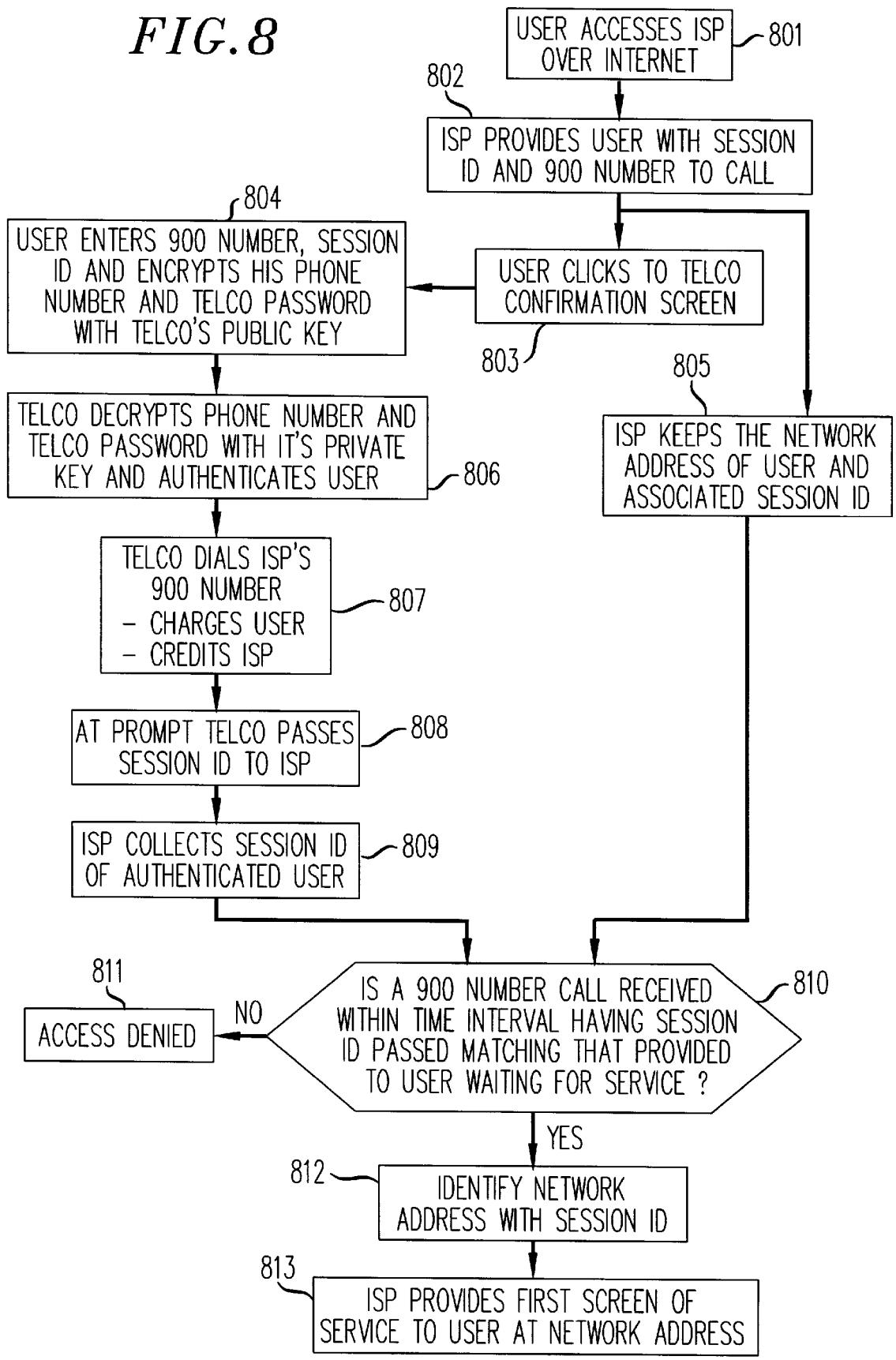
FIG. 8 is a flowchart for a third embodiment of the invention in which the user directs, via the Internet, the telephone company to place a 900 number billing call to the ISP for billing to his entered telephone number, and which uses a session identification number to properly associate the billing call with the Internet connection.
Figure 9:
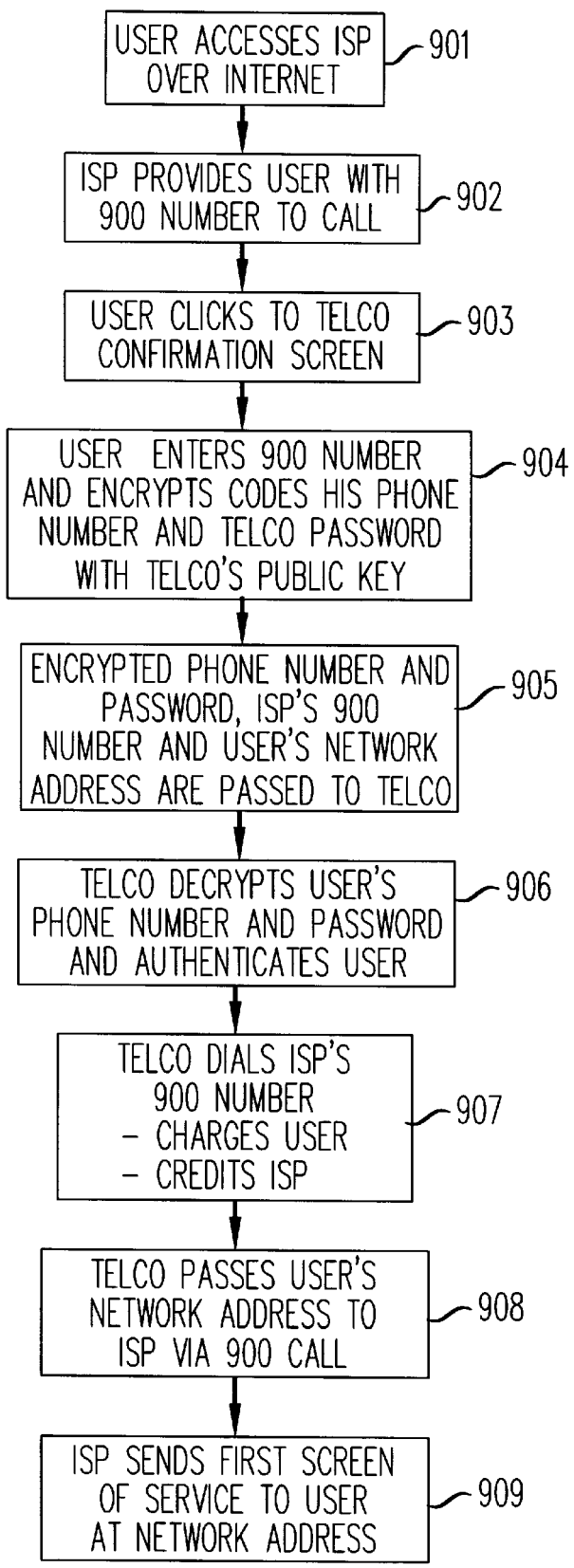
FIG. 9 is a flowchart for a fourth embodiment of the invention in which the user directs, via the Internet, the telephone company to place a 900 number billing call to the ISP for billing to his entered telephone number, and which uses the network address of the user on the Internet to properly associate the billing call with the Internet connection.
Figure 10:
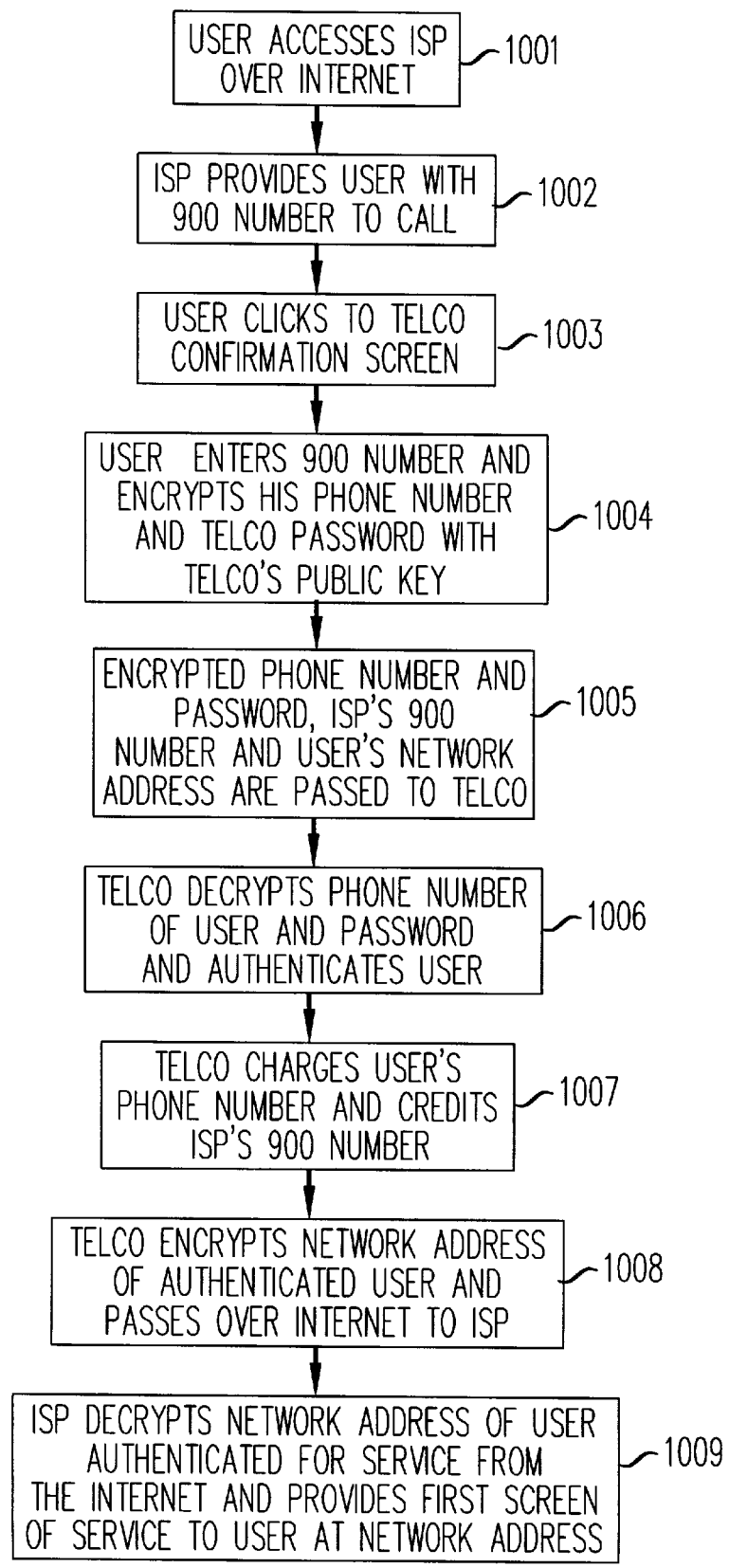
FIG. 10 is a flowchart for a fifth embodiment of the invention in which the user directs, via the Internet, the telephone company to charge his telephone account for a call to an ISP's 900 number billing number, without an actual phone 900 number billing call being placed to the ISP's 900 number.

FIGS. 8–10 are flowcharts illustrating scenarios in which the user clicks an icon to access a screen provided by the telephone company, which then places either a real or virtual telephone billing call to the ISP. In FIG. 8, the user access the ISP over the Internet (step 801), as in the previous scenario. The ISP provides the user with a session ID number and a 900 number to call for billing (step 802). The user the clicks on an icon and is connected to a telephone confirmation screen (step 803). The telephone confirmation screen requests the user to enter a 900 number to dial and a session ID number, together with the user's billing telephone number and associated telephone company password, the latter two being automatically encrypted with the telephone company's public key (step 804). Simultaneously, the ISP retains the network address of the user requesting service and the associated session ID number (step 805). The user-entered information is transmitted to the telephone company which decodes the user's phone number and password by applying its private key to authenticate the user (step 806), in the manner previously described. If authenticated, the telephone company dials the ISP's 900 billing number and charges the user for the call and credits the ISP (step 807). At a prompt, the telephone network passes the session ID number to the ISP over the phone connection (step 808). The ISP then collects the session ID of the authenticated user (step 809). If a 900 number billing call is not received by the ISP within a predetermined time interval and having the session ID of a user requesting service (step 810), the user is denied access to service (step 811). If a match is found, the user's session ID number is identified with the network address (step 812) and the ISP provides the first screen of service to the user at that network address (step 813).

FIG. 9 illustrates a scenario in which the network address of an authorized user rather than a session ID number is used to associate a request for service by a user on a billing call. The user accesses the ISP over the Internet (step 901) as in the previous scenarios and the ISP provides a screen to the user which indicates a 900 number to call for billing authorization (step 902). The user then clicks on a telephone company icon to receive a confirmation screen from the telephone company (step 903). The user enters this 900 number together with his billing telephone number and associated telephone company password, which are encrypted using the telephone company's public key (step 904). The encrypted phone number and password, the ISP's 900 number and the user's network address are then passed to the telephone company (step 905). The telephone company decrypts the users'phone number and password and authenticates the user (step 906). If the user is authenticated, the telephone company dials the ISP's 900 billing number and charges the user and credits the ISP (step 907). The network address of the authenticated user is then passed to the ISP on the 900 call (step 908). The ISP sends the first screen of service to the authenticated user at that network address (step 909).

FIG. 10 illustrates the scenario in which no actual 900 call is placed to the ISP's 900 billing number. Steps 1001–1006 are identical to steps 901–906 in FIG. 6, as previously described. At step 1007, rather than actually placing a 900 number call to the ISP, the telephone company directly charges the user's phone number for a 900 number call to the ISP and credits the ISP's 900 number account. The telephone company then passes the network address of an authenticated user to the ISP over the Internet, rather than the telephone network (step 1008). This network address is encrypted with the telephone company's public key to prevent unauthorized access. The ISP collects the encrypted network address of the user authenticated for service from the Internet, decrypts the address using the telephone company's private key, and provides the first screen of service to the user at the network address (step 1009).

Some users may not desire to authorize payment prior to receiving information and/or interactive service, in particular if they don't trust that once they have paid they might not receive the requested information and/or interactive service because of congestion on the Internet or other factors. In order to increase the user's confidence level, the information and/or interactive service can first be provided to the user and payment authorized thereafter through the previously described billing methodology of the present invention. For information services, in order to ensure that the user pays for the information, the information is sent to the user in two parts. The first part consists of information in the clear, which in principle does not include the content of the information of value, but does provide sufficient information necessary for a user to decide whether he is desirous of receiving and paying for the more valuable second part. The second more valuable part of the information is sent by the ISP to the user in an encrypted format. If the user, after viewing the first part of the information, decides to view the second part, then he initiates a billing procedure in any of the manners described above. Once billing is effected, the ISP signals the user's terminal to decrypt to already stored information. Interactive services could be provided in a similar manner.

Figure 11:
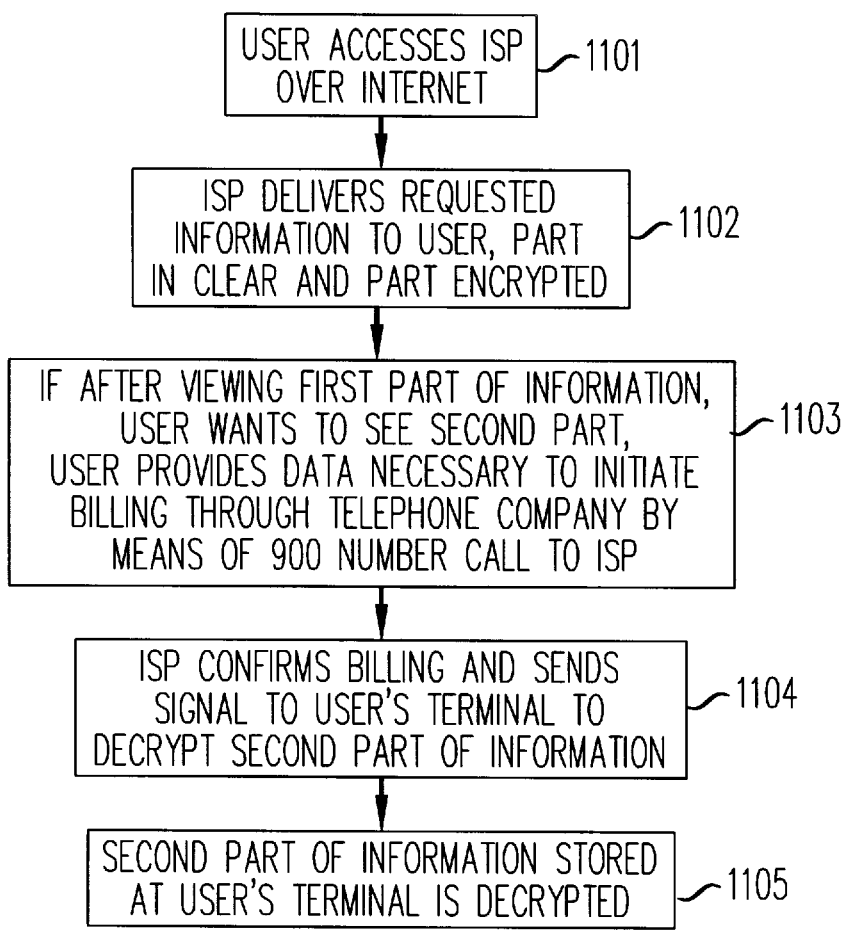
FIG. 11 is a flowchart of an embodiment of the invention in which a first part of the information and/or services requested by the user is provided in a clear format and the more valuable remaining second part of the information is provided in an encrypted format, wherein billing procedures through a 900 number billing call are effected if the user wishes to view the second part.

FIG. 11 is a flowchart detailing this "pay later" embodiment of the present invention. At step 1101, the user accesses the ISP over the Internet. The ISP delivers the requested information to the user in both a clear part and an encrypted part (step 1102). At step 1103, the user initiates a billing procedure through the telephone company by means of a 900 number call to the ISP if he desires to see the second part of the requested information. This billing procedure could be any of the methods previously described. At step 1104, the ISP confirms billing and sends a signal to the user's terminal to decrypt the second part of the information, and at step 1105, the second part of the information stored at the user's terminal is decrypted and made available to the user.

Other methods of "see now, pay later" can also be implemented. For example, all the requested information and/or services can be provided to a user before a billing procedure is required. After all the information and/or services are delivered to the user, the user is requested to institute one of the aforedescribed billing procedures. If he fails, however, to arrange for billing, the ISP may refuse that user future access.

The billing procedures of the present invention have been described herein above in connection with the billing for information and/or interactive services of the type generally available to a user on the Internet or other data network. The present invention could readily be applied to the provision to the user of any type of information and/or services to a user on a first connection over a network of any type, with billing being effected for that information and/or services on a second connection through the telephone network. Thus, the present invention could be used for software downloading over the Internet or other data network to a user who would be billed for the downloaded software by calling the vendor's 900 billing number. The invention could also be used for teleconferencing services, video services, TV services provided by cable and/or broadcast mediums, and interactive services such as games, bulletin boards and chat mediums. It is to be understood that the term "information and/or interactive services" is to include all of these types of information and services, and all others types not specifically mentioned. The network over which the information and/or interactive services can be provided can be a wired or wireless data network, or a wired or wireless analog network. The signals transmitted on the wired network can be electrical or optical in nature.

The above-described embodiments are illustrative of the principles of the present invention. Other embodiments could be devised by those skilled in the art without departing from the spirit and scope of the present invention.

The invention claimed is:

1. A method of billing for charges for information and/or interactive services provided to a user by a provider on a first point-to-point connection between the user and the provider at least in part over a data network, the user being associated with a telephone number on a switched telephone network separate from the data network, the method comprising the steps of:

initiating, by the user, a virtual billing telephone call to a provider's telephone number on the switched telephone network, the provider's telephone number being the type of telephone number in which the charge to a caller for a telephone call to that telephone number is determined by a called party, the virtual telephone call not being an actual telephone call placed to the provider's telephone number but an indication to a billing system associated with the switched telephone network to charge and bill the user for the cost of a telephone call to the provider's telephone number and to credit an account associated with the provider for receiving the virtual telephone call as if an actual phone call was made on the switched telephone network to the provider's telephone number, the charge to the user for the virtual billing telephone call to the provider's telephone number representing the cost for the user to obtain the information and/or interactive services provided by the provider on the first connection;

sending a message to the provider that the virtual billing telephone call to the provider's telephone number has been made;

associating the message with the first point-to-point connection between the user and the provider; and billing a telephone account associated with the telephone number associated with the user for the cost of the virtual billing telephone call as if an actual phone call was made to the provider's telephone number.

2. The method of claim 1 wherein the provider's telephone number is a 900 number.

3. The method of claim 1 further comprising the step of informing the provider that the telephone account associated with the telephone number associated with the user has been billed for the virtual billing telephone call.

4. The method of claim 3 wherein the step of informing the provider that the telephone account associated with the telephone number associated with the user has been billed for the virtual billing telephone call comprises the steps of:

determining a network address of the user on the first connection on the data network;

providing the a network address of the user to the telephone company; and supplying the network address of the user to the provider after the user's telephone account has been billed for the cost of the billing telephone call.

5. The method of claim 4 further comprising the step of encrypting the network address of the user that is supplied to the provider.

6. The method of claim 1 wherein the step of billing a telephone account is performed after the information and/or interactive services are provided to the user.

7. The method of claim 1 wherein a portion of the information and/or interactive services are provided to the user without charge prior to initiating the virtual billing telephone call to the provider's telephone number, and the remainder of the information and/or interactive services are provided to the user after the cost of the virtual billing telephone call is billed to the telephone account associated with user's telephone number.

8. The method of claim 1 wherein the first connection is over the Internet.

9. A system for billing for charges for information and/or interactive services provided to a user by a provider on a first point-to-point connection between the user and the provider at least in part over a data network, the user being associated with a telephone number on a switched telephone network separate from the data network, the method comprising the steps of:

means for initiating, by the user, a virtual billing telephone call to a provider's telephone number on the switched telephone network, the provider's telephone number being the type of telephone number in which the charge to a caller for a telephone call to that telephone number is determined by a called party, the virtual telephone call not being an actual telephone call placed to the provider's telephone number but an indication to a billing system associated with the switched telephone network to charge and bill the user for the cost of a telephone call to the provider's telephone number and to credit an account associated with the provider for receiving the virtual telephone call as if an actual phone call was made on the switched telephone network to the provider's telephone number, the charge to the user for the virtual billing telephone call to the provider's telephone number representing the cost for the user to obtain the information and/or interactive services provided by the provider on the first connection;

means for sending a message to the provider that the virtual billing telephone call to the provider's telephone number has been made;

means for associating the message with the first point-to-point connection between the user and the provider; and means for billing a telephone account associated with the telephone number associated with the user for the cost of the virtual billing telephone call as if an actual phone call was made to the provider's telephone number.

10. The system of claim 9 wherein the provider's telephone number is a 900 number.

11. The system of claim 9 further comprising means for informing the provider that the telephone account associated with the telephone number associated with the user has been billed for the virtual billing telephone call.

12. The system of claim 11 wherein the means for informing the provider that the telephone account associated with the telephone number associated with the user has been billed for the virtual billing telephone call:

means for determining a network address of the user on the first connection on the data network;

means for providing the a network address of the user to the telephone company; and means for supplying the network address of the user to the provider after the user's telephone account has been billed for the cost of the billing telephone call.

13. The system of claim 12 further comprising means for encrypting the network address of the user that is supplied to the provider.

14. The system of claim 9 wherein the means for billing a telephone account bills the telephone account associated with the telephone number associated with the user after the information and/or interactive services are provided to the user.

15. The system of claim 9 wherein a portion of the information and/or interactive services are provided to the user without charge prior to initiating the virtual billing telephone call to the provider's telephone number, and the remainder of the information and/or interactive services are provided to the user after the cost of the virtual billing telephone call is billed to the telephone account associated with user's telephone number.

16. The system of claim 9 wherein the first connection is over the Internet.

* * * * *